May 3, 1960 C. F. CHANDLER 2,935,560
FIELD RECOGNITION APPARATUS
Filed March 29, 1955
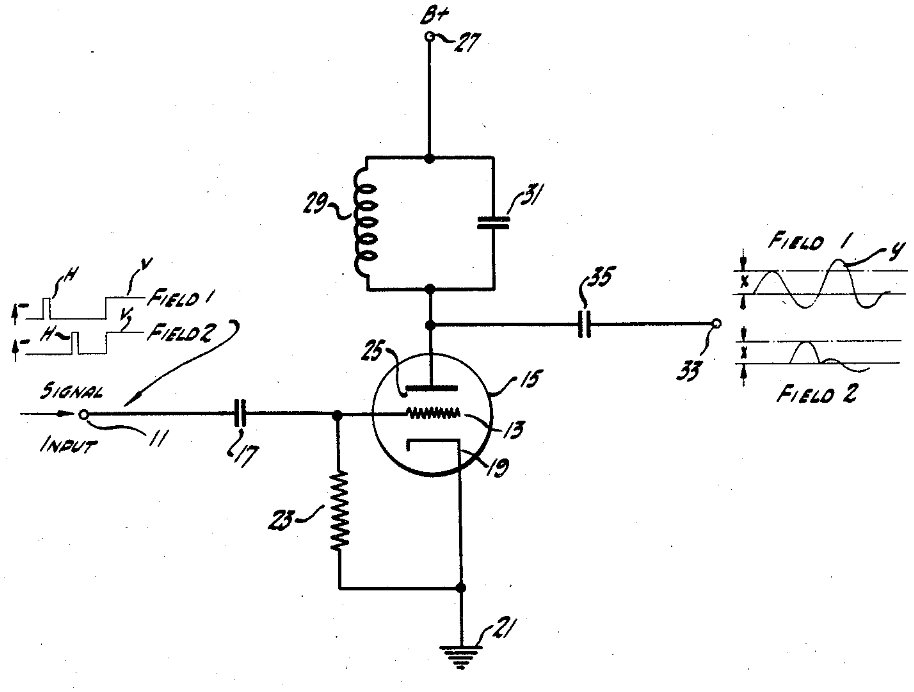
INVENTOR.
CARROLL F. CHANDLER
BY
Lippincott & Smith.
ATTORNEYS 2,935,560
Patented May 3, 1960

2,935,560

FIELD RECOGNITION APPARATUS

Carroll F. Chandler, Palo Alto, Calif., assignor to Admiral Corporation, Chicago, Ill., a corporation of Delaware Application March 29, 1955, Serial No. 497,575
3 Claims. (Cl. 178—7.3)

This invention relates to television apparatus. It is particularly concerned with circuitry of a type wherein identification of transmitted picture fields is made possible.

In the transmission of television signals, whether the transmission be black-and-white (monochrome) or color, when the signals are sent by standards now in force and established by the Federal Communications Commission each picture line and each picture field is followed by a suitable blanking signal. The blanking signals for lines of alternate picture fields are displaced, when the transmission is according to a double-interlace pattern, by one-half a line scanning period with respect to each of the vertical or field blanking pulses. Accordingly, in one field the vertical or field blanking pulse is spaced from the preceding line blanking pulse by a time duration representative of one scanned line of the picture, whereas in the next field (the interlaced field) the separation and time is a one-half line scanning period.

There are many reasons why it becomes desirable at times to identify the signal transmission of one field scanning with respect to another. Frequently in making measurements and in adjusting television transmitters or the like it is desirable to have ready means to observe the characteristics of one field transmission as compared with another field transmission.

In addition, it frequently becomes desirable to have a ready and convenient means for identifying one transmitted picture field as against one or more other fields which can be particularly true in connection with color television scannings and where there is an identification signal particularly characteristic of one of the transmitted color fields, as in a field sequential operation. This provides for color phasing.

Various other arrangements to select between different signals, of course, may be utilized where desired.

In accordance with the foregoing it becomes an object of this invention to achieve by simplified circuitry and a minimum of component parts an improved circuit to segregate different field transmissions for any and all uses. In accordance with the preferred form of the invention the signals as received and comprising composite blanking signals are supplied to control the current flow through a suitable keying tube in whose operating output circuit there is connected a high-Q resonant circuit tuned to the line scanning frequency. Output signals whose magnitude or other characteristics are controlled in accordance with the oscillating effect introduced into the resonant circuit are then supplied to control a suitable keying tube and oscillatory circuit.

The foregoing invention is schematically illustrated in one of its forms by the single figure of the drawing. Referring to this figure of the drawing the incoming signal pulse series, herein assumed to be signals indicative of conditions of blanking for both line and field signals, are supplied at an input terminal 11 in a polarity such that the signal pulse shown at H, for the horizontal or line blanking signal, and V, for vertical or field blanking signal, extends in the negative direction for reasons hereinafter to be pointed out.

The signals are supplied to the grid or control electrode 13 of an appropriate mixer tube 15 by way of the coupling condenser 17. The mixing tube has its cathode 19 connected to ground, as at 21, and the grid leak resistor 23 appropriately biases the grid. The tube plate 25 connects to a source of positive voltage conveniently represented by the designation B+ at the terminal point 27 by way of the inductance element 29 forming with the capacitor 31 an appropriate oscillatory circuit resonant at the line frequency. Either or both the inductor 29 and the capacitor 31 may be tunable.

The circuit comprising the inductance 29 and capacitor 31 is conventionally represented as a parallel resonant circuit adapted to resonate as a ringing circuit at approximately the line frequency, that is, the frequency between two successive or horizontal line synchronous pulses H. These pulses are separated in time by the time period required to transmit one line of the television image and accordingly occur at the rate of approximately 15,750 pulses per second. The pulse duration for the horizontal or line pulses is set by Federal Communications Commission standards and need not be further discussed. It will be appreciated that when the pulses are received the tube 15 is cut off by reason of the negative polarity of the incoming pulses. Ringing occurs in the oscillatory or resonating circuit at such times, but it will likewise be noted that the ringing on the horizontal blanking pulse H as diagrammatically illustrated by the conventionally represented waveforms adjacent to the output terminal 33 which is connected to the resonating circuit 29, 31 and the output of tube 15 by way of the capacitor 35, the ringing on the horizontal blanking pulse is lower in amplitude than that of the vertical pulse because tube 15 is cut off less than one-half cycle of ring and acts as a damper across the resonant circuit when in its normal operating or conducting state.

The resonant frequency of the ringing circuit comprising the inductance 29 and capacitor 31, which is of a resonant circuit of the so-called high-Q form, is set at approximately the line frequency, as hereinabove stated. Consequently, with respect to field 2 it will be observed that the ringing caused by the last horizontal blanking pulse H preceding the vertical pulse V is cancelled by the vertical blanking pulse and accordingly there will be a large ringing pulse only on the leading edge of the vertical blanking during field 1 in that the blanking voltage is greater than the cut off voltage of the tube. Under the circumstances, if the biasing value at which the pulse is utilized is set at a value greater than that designated as X, adjacent to the illustrative curves of outputs of fields 1 and 2, it will be seen that the portion Y above the dot-dash line for field 1 is indicative of the vertical blanking for each second field received. By selecting this pulse and using it either in its positive or its negative state various apparatus can be keyed at the selected 30 cycle rate to select one set of field signals as against another.

Various modifications may be made of course within the spirit and scope of this invention.

Having thus described the invention what is claimed is:

1. In television apparatus for identifying field signals for different fields of information, a keying tube, means to supply a composite signal including television blanking signals for both line and frame for a sequence of different image fields to the keying tube, means for biasing said tube to a current-conducting state except during the period of receipt of blanking signals, a high-Q resonant circuit connected in the output circuit of said tube, means for supplying operating voltages to the tube through said resonant circuit whereby the receipt of blanking pulses upon the tube so controls the current flow therethrough as to introduce a ringing effect in the resonant circuit and conductive periods in the tube provide a damping circuit across the resonant circuit, the resonant circuit being adapted to oscillate at a frequency substantially corresponding to line frequency blanking periods of the television signals and the amplitude of the blanking voltage as applied to the keying tube being greater than that required to drive the tube to cutoff, and a load circuit connected to the tube output.

2. In television apparatus for identifying field signals of transmitted video information, a keying tube, means to supply a composite signal including television blanking signals for both line and frame for a sequence of different image fields to the keying tube, means for biasing said tube to a current-conducting state, except during the period of receipt of blanking signals, a high-Q resonant circuit connected in the output circuit of said tube and including parallelly connected capacity and inductive elements, means for supplying operating voltages to the tube through said resonant circuit whereby the receipt of blanking pulses upon the tube so controls the current flow therethrough as to introduce a ringing effect in the resonant circuit and conductive periods in the tube provide a damping circuit across the resonant circuit, the resonant circuit being adapted to oscillate at a frequency substantially corresponding to line frequency blanking periods in the television signals and the amplitude of the blanking voltage as applied to the keying tube being greater than that required to drive the tube to cutoff, and a load circuit connected to the tube output.

3. In television apparatus for identifying field signals for different fields of information, a keying tube having an anode, a cathode and a control grid; means to supply a composite signal including television blanking signals for both line and frame for a sequence of different image fields to the keying tube, means for biasing said tube to a current-conducting state except during the period of receipt of blanking signals, a high-Q resonant circuit connected in series with the anode of said tube in the output circuit of the tube, means for supplying operating voltages to the tube through said resonant circuit whereby the receipt of blanking pulses upon the tube so controls the current flow therethrough as to introduce a ringing effect in the resonant circuit and conductive periods in the tube provide a damping circuit across the resonant circuit, the resonant circuit being adapted to oscillate at a frequency substantially corresponding to line frequency blanking periods of the television signals and the amplitude of the blanking voltages applied to the keying tube being greater than that required to drive the tube to cutoff, and a load circuit connected to the tube output.

References Cited in the file of this patent

UNITED STATES PATENTS

| | | |
|---|---|---|
| 2,251,929 | Freeman | Aug. 12, 1941 |
| 2,265,988 | Andrieu | Dec. 16, 1941 |
| 2,462,061 | Beatty | Feb. 22, 1949 |
| 2,689,880 | Hollywood | Sept. 21, 1954 |
| 2,697,744 | Richman | Dec. 21, 1954 |